US007020248B2

United States Patent
Ludeman

(12) United States Patent
(10) Patent No.: US 7,020,248 B2
(45) Date of Patent: Mar. 28, 2006

(54) APPARATUS AND METHOD FOR TESTING SUBSCRIBER LOOP INTERFACE CIRCUITS

(76) Inventor: Christopher Ludeman, 911 Sunswept Rd, NE., Palm Bay, FL (US) 32905

( * ) Notice: Subject to any disclaimer, the term of this patent is extended or adjusted under 35 U.S.C. 154(b) by 0 days.

(21) Appl. No.: 10/078,362

(22) Filed: Feb. 21, 2002

(65) Prior Publication Data

US 2002/0122538 A1 Sep. 5, 2002

Related U.S. Application Data

(62) Division of application No. 09/208,457, filed on Dec. 10, 1998.

(51) Int. Cl.
*H04M 1/24* (2006.01)

(52) U.S. Cl. ............... 379/27.01; 379/1.01; 379/29.04; 379/26.02; 379/27.04; 379/26.01

(58) Field of Classification Search ............ 379/26.02, 379/26.01, 27.01, 24, 29.03, 29.04, 1.01, 379/399.01, 29.05, 29.01, 30, 402, 390.04, 379/387.01
See application file for complete search history.

(56) References Cited

U.S. PATENT DOCUMENTS

| | | | |
|---|---|---|---|
| 4,860,332 A | 8/1989 | Chism | |
| 5,659,570 A | 8/1997 | Cotreau et al. | |
| 5,854,839 A | 12/1998 | Chen et al. | |
| 6,144,722 A | 11/2000 | Anderson et al. | |

*Primary Examiner*—Rexford Barnie

(57) ABSTRACT

A method and apparatus for internally testing portions of a subscriber loop interface circuit. Testing may be conducted on a semiconductor circuit including the subscriber loop interface circuit. The portion of the subscriber loop interface circuit being tested may be the ring trip detector and/or the off-hook detect circuit. Testing may be conducted without disabling the capability of the subscriber loop interface circuit to monitor the hook status of a subscriber.

5 Claims, 1 Drawing Sheet

SUBSCRIBER LOOP INTERFACE CIRCUIT

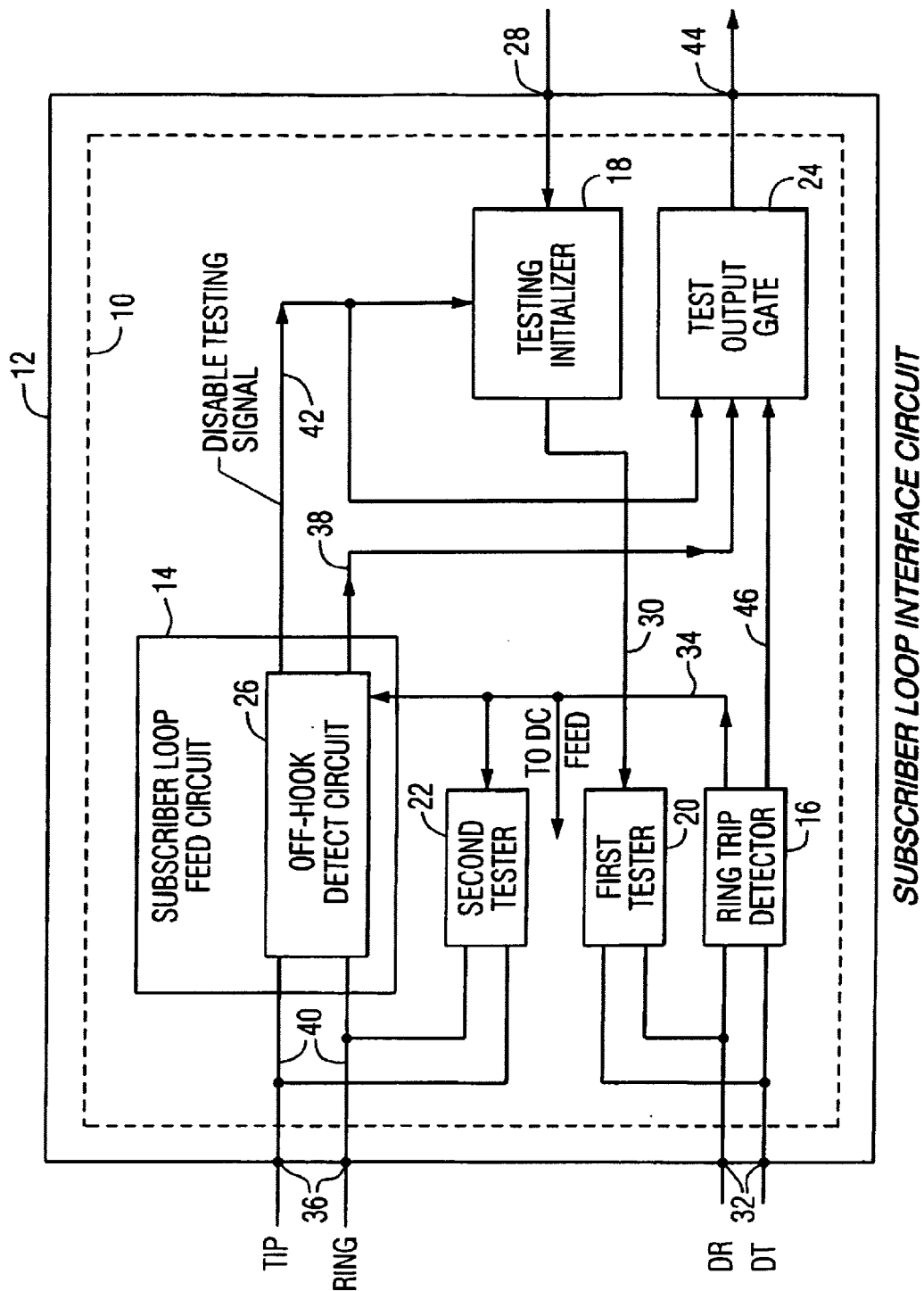

APPARATUS AND METHOD FOR TESTING SUBSCRIBER LOOP INTERFACE CIRCUITS

THIS APPLICATION IS A DIVISION OF Ser. No. 09/208,457 FILED Dec. 10, 1998.

BACKGROUND OF THE INVENTION

This invention relates to semiconductor integrated circuits having a subscriber loop interface circuit and, more specifically, the invention relates to semiconductor integrated circuits having a subscriber loop interface circuit including circuitry for internally testing the operation of the subscriber loop interface circuit.

A subscriber loop interface circuit ("SLIC") is generally employed as an interface between a subscriber such as a residential telephone subscriber and a subscriber network. A SLIC may provide functions such as two-to-four wire conversion, battery feed, line supervision, or common mode rejection.

Generally, a subscriber loop includes a SLIC, a subscriber terminal device (e.g., a telephone), and a pair of subscriber lines connecting the SLIC and the subscriber terminal device.

In one prior art technique for using SLIC's in a subscriber loop, a central office operating as a switching station includes a SLIC for every subscriber being served by the central office. The central office may also include relays for connecting a ringing signal, a tone signal, or an incoming communication to each SLIC.

To maintain a high degree of reliability, the central office may include dedicated test hardware and software for the purpose of testing the integrity of subscriber loops. The dedicated test equipment may include hardware and software for testing the integrity of subscriber loop interface circuits. Typically, the test hardware resides in the central office and is shared for testing several subscriber loops. The central office may include electromechanical relays or solid state switches for connecting each subscriber loop interface circuit to test hardware.

Testing of SLIC's at a central office is usually extensive and includes leakage, capacitance, detection, return loss, and continuity testing. Testing of SLIC's at a central office may also include loop back testing. Typically, a loop back test is conducted by placing a load across the two subscriber line terminals of a SLIC and measuring the resulting current flow. The load may be a 600 ohm resistor. The load is typically placed off-chip to protect the SLIC semiconductor material from heat that may be generated by the load during testing. During this technique for loop back testing, a SLIC is unable to detect a subscriber off-hook signal and, therefore, the subscriber is locked out during testing.

Testing may also be required in other subscriber environments. In loop carrier systems, SLIC's are employed in remote stations. In general, each remote station serves a small number of subscribers and includes a physical or wireless connection to a central office. Loop carrier systems are typically smaller in size and less costly than systems such as residential phone systems. Providing SLIC testing in a remote station may substantially increase the cost and overhead in building a loop carrier system. However, the cost of servicing remotely located stations may also be costly.

Accordingly, it is an object of the present invention to provide a novel semiconductor circuit having a subscriber loop interface circuit comprising a circuit for testing a ring trip detector portion of the subscriber loop interface circuit.

It is another object of the present invention to provide a novel semiconductor circuit having a subscriber loop interface circuit including a circuit for testing an off-hook detect portion of the subscriber loop interface circuit.

It is yet another object of the present invention to provide a novel apparatus in a semiconductor subscriber loop interface circuit for testing both the ring trip detector and the off-hook detect portions of the subscriber loop interface circuit without disabling the capability of the subscriber loop interface circuit to monitor the hook status of the subscriber.

It is still another object of the present invention to provide a novel method for internally testing portions of a subscriber loop interface circuit.

It is a further object of the present invention to provide a novel method and apparatus for simultaneously testing a ring trip detector and an off-hook detect circuit of a subscriber loop interface circuit.

It is yet a further object of the present invention to provide a novel method and apparatus for detecting an off-hook signal during internal testing of an off-hook detect circuit.

It is still a further object of the present invention to provide a novel method and apparatus for internally testing portions of a subscriber loop interface circuit.

These and many other objects and advantages of the present invention will be readily apparent to one skilled in the art to which the invention pertains from a perusal of the claims, the appended drawings, and the following detailed description of the preferred embodiments.

BRIEF DESCRIPTION OF THE DRAWINGS

FIG. 1 is a functional block diagram illustrating an embodiment of a semiconductor circuit including a subscriber loop interface circuit of the present invention.

DESCRIPTION OF PREFERRED EMBODIMENTS

With reference to FIG. 1, a subscriber loop interface circuit 10 in a semiconductor circuit 12 may include a subscriber loop feed circuit 14, a ring trip detector 16, a testing initializer 18, a first tester 20, a second tester 22, and a test output gate 24. An off-hook detect circuit 26 may be a part of the subscriber loop feed circuit 14 or may be separate therefrom.

In operation, testing of both the ring trip detector 16 and the off-hook detect circuit 26 may be initiated by placing a signal on a single control terminal 28. A terminal may be considered to be a junction on the semiconductor circuit 12, SLIC 10, and/or a portion of the SLIC. Testing may also be initiated by using an internal node activated by a digital command signal received by the subscriber loop interface circuit. The command signal when received may initiate a testing state from a predetermined number of other SLIC states.

In typical SLIC designs, a ring signal, a high voltage signal generated by a central ring generator, is always applied to the ring trip detector terminals 32. The input signals on the ring trip detector terminals 32 are identical as long as the SLIC is in a non-rining state.

Ringing of a subscriber terminal device may generally be accomplished by a central office sending a control code to a SLIC initiating a "ringing" state and activating a ring relay for connecting the subscriber terminal device to the ring trip detector terminals (e.g., establishing a subscriber loop). When the ring relay is activated, a load such as a bell circuit may be placed across the subscriber lines of a subscriber loop. The load may imbalance the voltages or currents at the ring trip terminals. Typically, the ring trip detector 16 monitors the difference (imbalance) between the voltages or currents at the ring trip detector terminals 32 to detect a difference of a sufficient magnitude which indicates an off-hook condition during ringing. During ringing, the difference between the voltages or currents is usually not enough to trip the threshold set in the ring trip detector. If during ringing a subscriber terminal device is placed in an off-hook condition, then the load across the subscriber lines increases significantly. The increase in load may cause a dc current difference on the ring trip device terminals that is sufficient to trip the detector (i.e., the "ring trip" or "off hook" conditions is indicated). Any ac current difference is typically filtered using a capacitor.

In conventional SLIC design, as long as there is current or voltage difference at the ring trip detector terminals, the ring trip detector generates a zero crossing signal for use in other portions of the SLIC.

When testing is initiated, the test initializer 18 may transmit a signal to the first tester 20 via line 30. The first tester 20 may include a current source having a connection to at least one of the ring trip detector terminals 32. In response to the test initializer 18, the first tester 20 unbalances the identical input signals on the ring trip detector terminals 32. The purpose of unbalancing the input signals is to simulate an off-hook condition at the input to the ring trip detector 16 and trigger an output signal RTD on line 34. Activation of the output signal RTD is an indication that the ring trip detector 16 is operating correctly. The ring trip detector 16 always generates a zero crossing signal such as a square wave signal on line 46 while the signal on the ring trip detector terminals 32 is sufficiently imbalanced. The zero crossing signal may be generated at twice the ringing frequency.

The output signal RTD when received by the second tester 22 may activate the second tester 22. The output signal RTD may also be received by the off-hook detect circuit to select a first signal threshold as indicating a simulated off-hook subscriber condition and a second signal threshold (higher than the first signal threshold) as indicating an actual off-hook subscriber condition. When activated, the second tester 22 may place a defined current source across the subscriber loop that is sufficient to activate the off-hook detect circuit 26. The second tester 22 may include a current source connected across lines 40. If the off-hook detect circuit 26 detects the first signal threshold, the off-hook detect circuit may generate an internal switch hook detect signal on line 38.

The subscriber loop feed circuit 14 may include circuitry for sensing voltage or current signals on lines 40. Techniques for sensing signals on lines 40 are generally known in the art of SLIC design.

The internal switch hook detect signal on line 38 may be an indication that the off-hook detect circuit is operating correctly. The internal switch detect signal along with the zero crossing signal may be received by the test output gate 24 to generate a pulsing output signal at the ringing frequency as an indication of test results. The pulsing output signal may be placed on a single terminal 44 of the subscriber loop interface circuit. No extra leads or terminals may be needed for internally testing the subscriber loop interface circuit since the command signal may be placed on an existing terminal for sending command signals to the SLIC and the output terminal 44 may be for dual use with another SLIC function.

During testing, a subscriber terminal device connected to the subscriber lines (TIP and RING) may be placed in an off-hook condition (i.e., an off-hook subscriber). The off-hook detect circuit 26 may monitor for a predetermined increase in current flowing on lines 40 to detect the off-hook subscriber. For example, the off-hook detect circuit may measure the signal on lines 40 to determine the difference between the first signal threshold (indicating a detected simulated off-hook subscriber) and the signal on lines 40. When the signal on lines 40 reaches the second signal threshold, the off-hook detect circuit 26 may trigger to indicate an actual off-hook condition. The off-hook detect circuit may include a first comparator for detecting the first signal threshold as indicating a simulated off-hook subscriber condition and a second comparator for detecting the second signal threshold as indicating an off-hook subscriber. The signal threshold dichotomy may be selected using the output signal RTD from the ring trip detector 16. If, during testing, an off-hook subscriber is detected, the off-hook detect circuit 26 may generate a disable testing signal on line 42 which may be provided to the testing initializer 18 and the test output gate 24. The disable testing signal may set the pulsing signal of the test output gate as being continuously low. In non-testing operation of the subscriber loop interface circuit, an off-hook subscriber may be identified by the detection of the first signal threshold by the off-hook detect circuit 26. The first tester 20 and the second tester 22 with the use of the two signal thresholds allow for simultaneous testing of the off-hook detect circuit and ring trip detector without disabling the subscriber loop interface circuit during testing.

The output signal RTD may also be received by the DC feed circuit portion (not shown) of the subscriber loop interface circuit. In response to receiving the output signal RTD, the DC feed circuit may control the voltage supplied to the subscriber line terminals (TIP and RING terminals) 36 of the subscriber loop interface circuit to thereby maintain the voltage across the terminals 26 at a constant predetermined value during testing. The voltage across the subscriber line terminals 36 is defined to be a constant voltage during testing so that the full loop voltage is available for loop feeding. One technique for providing a constant voltage across the terminals 36 (loop voltage) is described in copending application Ser. No. 09/145,182 entitled "Programmable Subscriber Loop Interface Circuit and Method" by Christopher Ludeman, the inventor hereof, which is incorporated herein by reference. Maintaining the loop voltage at a constant during testing allows for the subscriber loop interface circuit to have the same off-hook detection performance as during non-testing.

The loop feed characteristic of the subscriber loop interface circuit may be the same during testing and during other SLIC operations except that during testing the SLIC is in a constant voltage mode until the second signal threshold is detected.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. In a semiconductor integrated circuit having a subscriber loop interface circuit that includes a ring trip detector and an off-hook detect circuit, the improvement comprising first and second testing means operatively connected to test the ring trip detector and the off-hook detect circuits without disabling the monitoring of the off-hook status of a subscriber terminal device, wherein said off-hook detect circuit is responsive to (a) a signal having a first predetermined characteristic for indicating the presence of a test signal, and (b) a second predetermined characteristic for indicating the presence of an off-hook signal and aborting a test of the ring trip detector or the off-hook detect circuits in response thereto.

2. The circuit of claim 1 wherein the characteristic of the first signal and the characteristic of the second signal are the same, and wherein the value of the second characteristic is higher than the value of the first characteristic.

3. The circuit of claim 1 wherein said first and second testing means is capable of simultaneously testing the ring trip detector and the off-hook detect circuit while actively monitoring the off-hook status of a subscriber terminal device.

4. The circuit of claim 3 wherein said internal testing means distinguishes between signals of two different thresholds.

5. The circuit of claim 4 wherein said internal testing means does not interfere with the detection of an off-hook signal.

* * * * *